US009394885B2

(12) United States Patent
Vesely

(10) Patent No.: US 9,394,885 B2
(45) Date of Patent: Jul. 19, 2016

(54) ENERGY STORAGE SYSTEM

(71) Applicant: Earl Vesely, Wood, SD (US)

(72) Inventor: Earl Vesely, Wood, SD (US)

(*) Notice: Subject to any disclaimer, the term of this patent is extended or adjusted under 35 U.S.C. 154(b) by 189 days.

(21) Appl. No.: 14/282,191

(22) Filed: May 20, 2014

(65) Prior Publication Data

US 2015/0337810 A1    Nov. 26, 2015

(51) Int. Cl.
*F03D 9/00* (2016.01)

(52) U.S. Cl.
CPC *F03D 9/008* (2013.01); *F03D 9/14* (2016.05); *Y02E 10/72* (2013.01)

(58) Field of Classification Search
CPC ........................................ F03D 9/008
USPC ................... 290/1 R, 43, 44, 54, 55
See application file for complete search history.

(56) References Cited

U.S. PATENT DOCUMENTS

| 4,426,846 | A | 1/1984 | Bailey | |
|---|---|---|---|---|
| 4,443,707 | A * | 4/1984 | Scieri et al. | 290/4 R |
| 7,944,075 | B2 | 5/2011 | Boone | |
| 8,018,079 | B2 | 9/2011 | Kelly | |
| 8,030,790 | B2 | 10/2011 | Kamenov | |
| 8,166,760 | B2 | 5/2012 | Fiske | |
| 8,492,918 | B1 * | 7/2013 | Kamenov | 290/43 |
| 2009/0066090 | A1 * | 3/2009 | Boone | 290/55 |
| 2009/0193808 | A1 | 8/2009 | Fiske | |
| 2011/0133466 | A1 * | 6/2011 | Kamenov | 290/55 |
| 2012/0112472 | A1 | 5/2012 | Murray et al. | |
| 2012/0187692 | A1 * | 7/2012 | Walton et al. | 290/54 |
| 2012/0204563 | A1 | 8/2012 | Fiske | |

* cited by examiner

*Primary Examiner* — Tulsidas C Patel
*Assistant Examiner* — Sean Gugger

(57) ABSTRACT

An energy storage system uses energy produced by a primary energy generation assembly beyond a peak primary use production limit to increase potential energy in a secondary energy generation assembly for later use to supplement energy produced by the primary energy generation assembly during periods of less than peak energy production by the primary energy generation assembly. The system includes a primary energy generation assembly having a peak primary use production limit and a peak total production limit. The peak total production limit is greater than the peak primary use production limit. A secondary energy generation assembly utilizes gravitational transfer of a weighting material from an elevated position to a lowered position to produce electrical energy. The secondary energy generation assembly is selectively actuatable such that energy generated by the secondary energy generation assembly supplements energy produced by the primary energy generation assembly.

7 Claims, 4 Drawing Sheets

ENERGY STORAGE SYSTEM

BACKGROUND OF THE DISCLOSURE

Field of the Disclosure

The disclosure relates to energy storage devices and more particularly pertains to a new energy storage device for using energy beyond an upper usable limit to increase potential energy in a secondary energy generator to supplement energy produced by the wind generator during periods of less than peak energy production.

SUMMARY OF THE DISCLOSURE

An embodiment of the disclosure meets the needs presented above by generally comprising a primary energy generation assembly having a peak primary use production limit and a peak total production limit. The peak total production limit is greater than the peak primary use production limit. A secondary energy generation assembly utilizes gravitational transfer of a weighting material from an elevated position to a lowered position to produce electrical energy. The secondary energy generation assembly is selectively actuatable such that energy generated by the secondary energy generation assembly supplements energy produced by the primary energy generation assembly. Energy produced by the primary energy generation assembly in excess of the peak primary use production limit is utilized to move the weighting material from the lowered position to the elevated position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
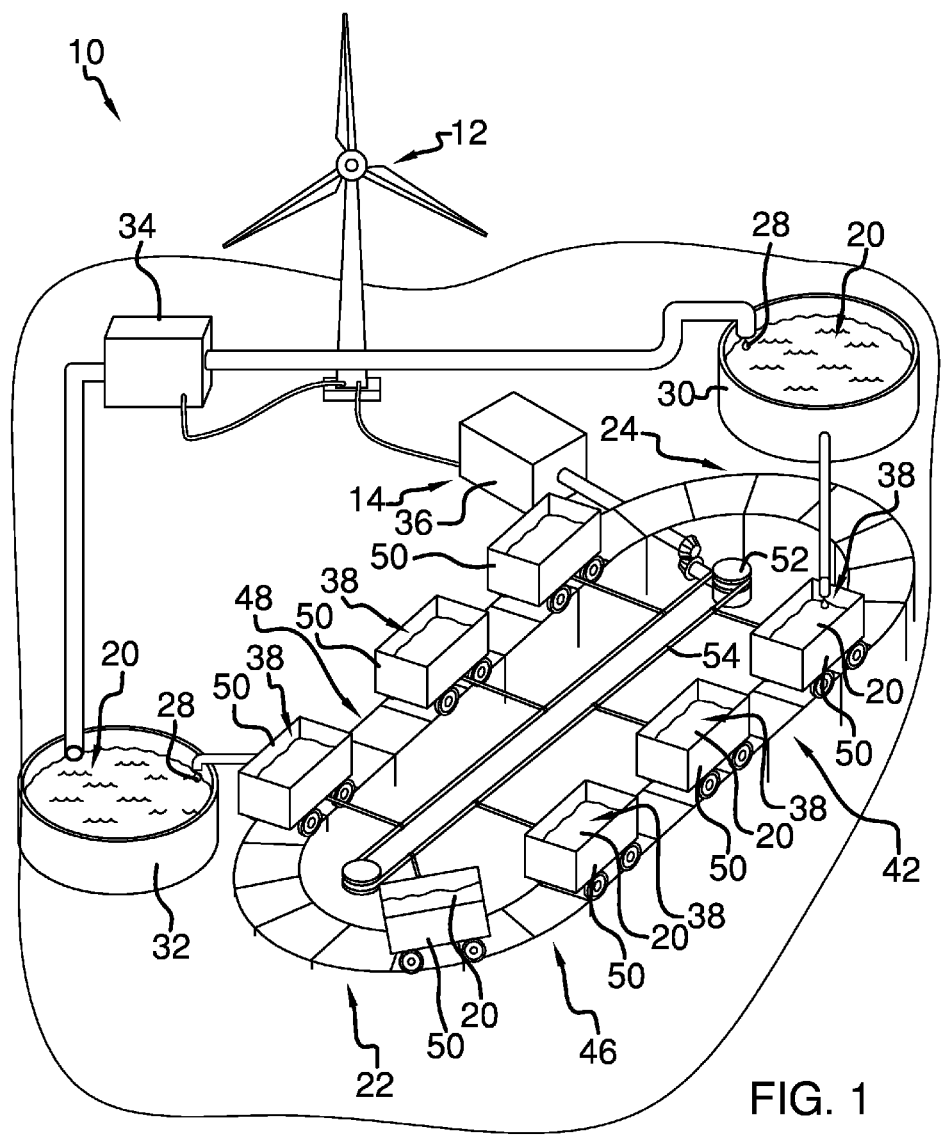
FIG. 1 is a top front side perspective view of an energy storage system according to an embodiment of the disclosure.

With reference now to the drawings, and in particular to FIGS. 1 through 4 thereof, a new energy storage device embodying the principles and concepts of an embodiment of the disclosure and generally designated by the reference numeral 10 will be described.

Figure 2:
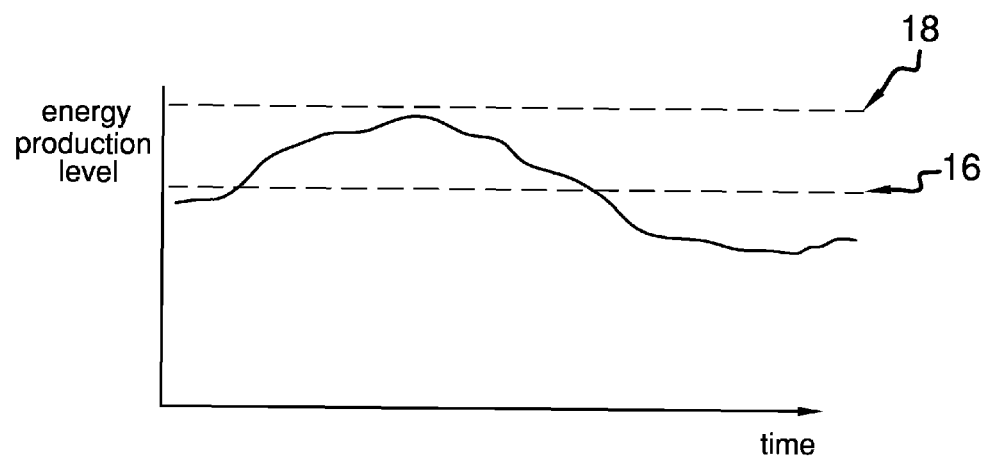
FIG. 2 is a graphic view of energy production by the primary energy production assembly of an embodiment of the disclosure.

As best illustrated in FIGS. 1 through 4, the energy storage system 10 generally comprises a primary energy generation assembly 12 and a secondary energy generation assembly 14. The primary energy generation assembly 12 typically comprises a windmill of substantially conventional design wherein energy production is variable based on the presence and strength of wind to drive the windmill. Thus, the primary energy generation assembly 12 has a peak primary use production limit 16 and a peak total production limit 18 as represented in FIG. 2. The peak primary use production limit 16 is the maximum amount of energy derived and used for the primary purpose of contributing energy to an energy system, typically for commercial use. Generally, energy produced in excess of the peak primary use production limit 16 was not stored or contributed to the primary purpose, essentially going to waste. The peak total production limit 18 is the maximum peak of energy which may be produced under optimum conditions and is greater than the peak primary use production limit 16. In the present system 10 energy produced by the primary energy generation assembly 12 in excess of the peak primary use production limit 16 is utilized to move a weighting material 20 from a lowered position 22 to an elevated position 24 within the secondary energy generation assembly 14. The secondary energy generation assembly 14 utilizes gravitational transfer of the weighting material 20 from the elevated position 24 to the lowered position 22 to produce electrical energy. The secondary energy generation assembly 14 is selectively actuatable such that energy generated by the secondary energy generation assembly 14 supplements energy produced by the primary energy generation assembly 12 during periods of time when conditions do not support production of the peak primary use production limit 16. The weighting material 20 comprises a fluid 28 which may be water. The fluid 28 is pumped from the lowered position 22 to the elevated position 24 using the energy produced by the primary energy generation assembly 12 in excess of the peak primary use production limit 16.

The secondary energy generation assembly 14 comprises a first storage tank 30 positioned holding the fluid 28 at the elevated position 24. The first storage tank 30 may be either man made of conventional design or may be natural such as a pool, pond, or lake, which may also be man made if no natural water source is present near the elevated position 24. A second storage tank 32 is also provided holding the fluid 28 at the lowered position 22 until such time as excess energy production is available from the primary energy generation assembly 12 to power a pump 34 fluidly coupling the second storage tank 32 to the first storage tank 30 such that the pump 34 transfers the fluid 28 from the second storage tank 32 to the first storage tank 30 when activated. The second storage tank 32 may be considered to comprise not only a man made tank according to a conventional definition or a natural water resource into which water can be deposited and from which water can be taken. The natural water resource may be substantially still such as a pond, lake, or the like, or may be moving such as a stream, river, or the like.

Figure 3:
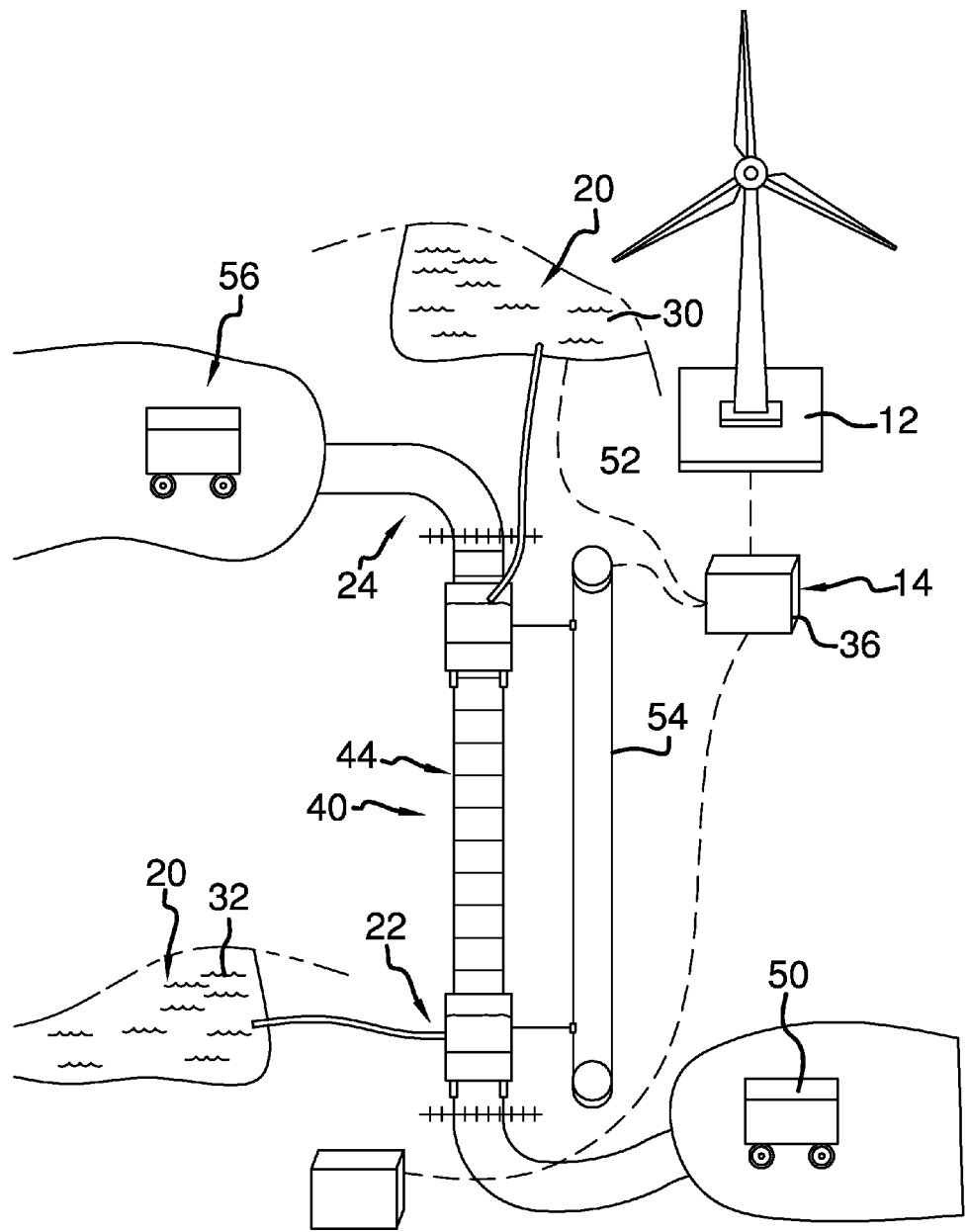
FIG. 3 is a top front side perspective view of an embodiment of the disclosure.
Figure 4:
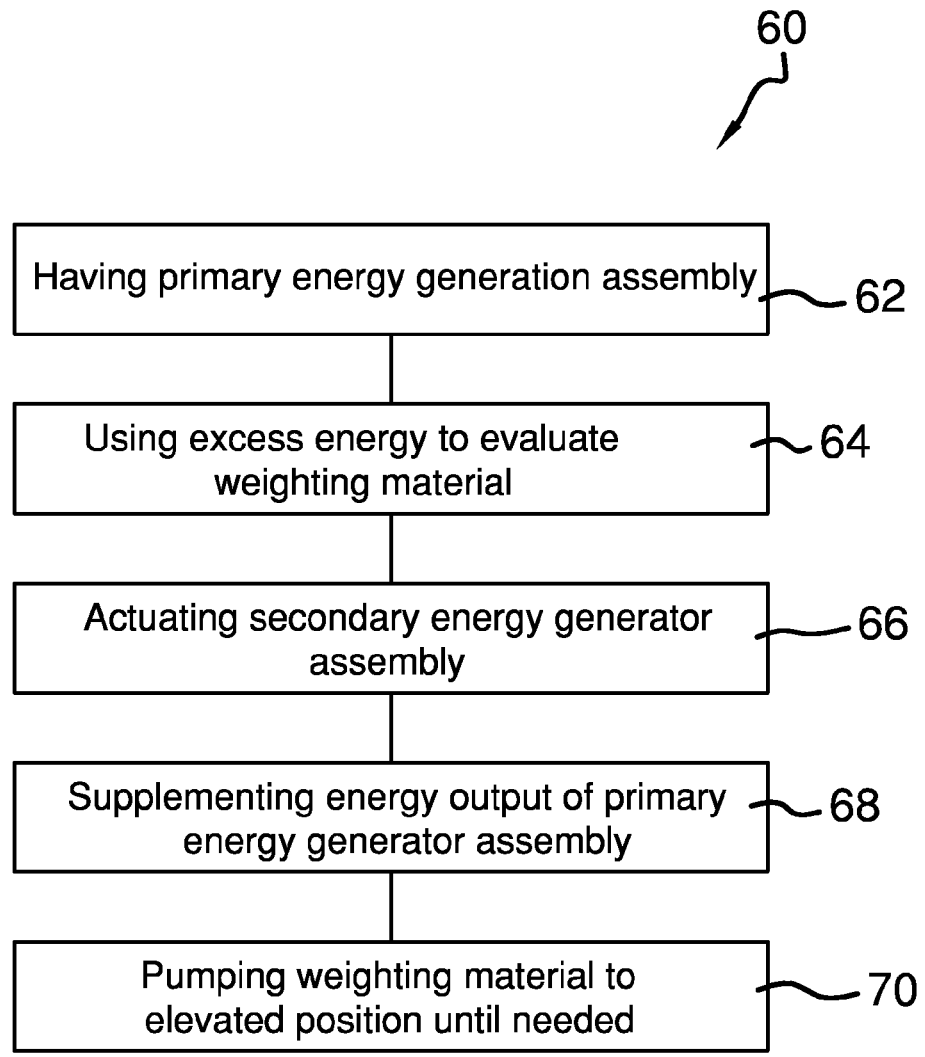
FIG. 4 is a schematic view of a method according to an embodiment of the disclosure.

A generator 36 is driven by gravitational transfer of the fluid 28 from the elevated position 24 to the lowered position 22 using a plurality of chambers 38. Each of the chambers 38 holds the fluid 28 as the fluid 28 is transferred from the elevated position 24 to the lowered position 22. A track 40 extends between the elevated position 24 and the lowered position 22. The track 40 may be a single linear extent 44 as shown in FIG. 3 or a circuit 42, as shown in FIG. 1. The circuit 42 has a first section 46 and a second section 48. The first section 46 extends from the elevated position 24 to the lowered position 22 and the second section 48 extends from the lowered position 22 back to the elevated position 24. Each of a plurality of cars 50 is provided. Each of the chambers 38 is coupled to an associated one of the cars 50. Each of the cars 50 is coupled to the track 40 such that each car 50 is movable from the elevated position 24 to the lowered position 22 on the track 40. The weighting material 20 is used to facilitate movement of each car 50 from the elevated position 24 to the lowered position 22 and is then removed from the chamber 38 when the car 50 is at the lowered position 22. In the embodiment shown in FIG. 4, each car 50, may be removed from the track 40 at the lowered position 22 and later returned to the elevated position 24 while empty. A storage area 56 is positioned adjacent the elevated position 24. Each of the cars 50 is positionable within the storage area 56 when the secondary energy generation assembly 14 is not in use. In the embodiment shown in FIG. 3, the cars 50 may be stored in the storage area 56 or remain on the circuit 42. Each car 50 is emptied of the fluid 28 at the lowered position 22 and movement of the weighted cars 50 moving from the elevated position 24 to the lowered position 22 returns the emptied cars 50 to the elevated position 24.

A pulley 52 is operationally coupled to the generator 36 such that rotation of the pulley 52 activates and drives the generator 36. A cable 54 is engaged to the pulley 52 wherein movement of the cable 54 rotates the pulley 52. Each of the cars 50 is coupled to the cable 54 wherein movement of the cars 50 from the elevated position 24 to the lowered position 22 moves the cable 54 such that the pulley 52 is rotated.

In use, the system 10 provides for a method 60 of storing energy for later use to supplement energy produced by the primary energy generation assembly 12 during periods of less than peak energy production. The method 60 comprises a step 62 of having the primary energy generation assembly 12 as described above. Another step 64 is using energy produced by the primary energy generation assembly 12 in excess of the peak primary use production limit to move the weighting material 20 from the lowered position 22 to the elevated position 24. Another step 66 is actuating the secondary energy generation assembly 14 and the secondary energy generation assembly transferring the weighting material 20 from the elevated position 24 to the lowered position 22 to produce electrical energy. Yet another step 68 is supplementing energy produced by the primary energy generation assembly 12 with the electrical energy produced by the secondary energy generation assembly 14. The method 60 may further comprise the step 66 comprising actuating the secondary energy generation assembly 14 more specifically during periods of less than peak energy production by the primary energy generation assembly 12. Still another step 70 is pumping the weighting material 20 from the lowered position 22 to the elevated position 24 for storage until the weighting material 20 is used to facilitate the secondary energy generation assembly 14 generating energy to supplement the primary energy generating assembly 12. The method 60 may further include steps less explicitly described or implied in the above description of the system 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An energy storage system comprising:
    a primary energy generation assembly, said primary energy generation assembly having a peak primary use production limit and a peak total production limit, said peak total production limit being greater than said peak primary use production limit;
    a secondary energy generation assembly, said second energy generation assembly utilizing gravitational transfer of a weighting material from an elevated position to a lowered position to produce electrical energy, said secondary energy generation assembly being selectively actuatable such that energy generated by said secondary energy generation assembly supplements energy produced by said primary energy generation assembly said secondary energy generation assembly comprising
        a first storage tank positioned holding said fluid at said elevated position,
        a second storage tank holding said fluid at said lowered position,
        a pump fluidly coupling said second storage tank to said first storage tank wherein said pump transfers said fluid from said second storage tank to said first storage tank, and
        a generator, said generator being driven by gravitational transfer of said fluid from said elevated position to said lowered position;
    wherein energy produced by said primary energy generation assembly in excess of said peak primary use production limit is utilized to move said weighting material from said lowered position to said elevated position; and
    a plurality of chambers, each of said chambers holding said fluid and moving with said fluid from said elevated position to said lowered position.

2. The system of claim 1, further comprising said primary energy generation assembly comprising a windmill.

3. An energy storage system comprising:
    a primary energy generation assembly, said primary energy generation assembly having a peak primary use production limit and a peak total production limit, said peak total production limit being greater than said peak primary use production limit;
    a secondary energy generation assembly, said second energy generation assembly utilizing gravitational transfer of a weighting material from an elevated position to a lowered position to produce electrical energy, said secondary energy generation assembly being selectively actuatable such that energy generated by said secondary energy generation assembly supplements energy produced by said primary energy generation assembly, said weighting material comprising a fluid, said fluid being pumped from said lowered position to said elevated position using said energy produced by said primary energy generation assembly in excess of said peak primary use production limit, said secondary energy generation assembly comprising
a first storage tank positioned holding said fluid at said elevated position,
a second storage tank holding said fluid at said lowered position,
a pump fluidly coupling said second storage tank to said first storage tank wherein said pump transfers said fluid from said second storage tank to said first storage tank, and
a generator, said generator being driven by gravitational transfer of said fluid from said elevated position to said lowered position;
wherein energy produced by said primary energy generation assembly in excess of said peak primary use production limit is utilized to move said weighting material from said lowered position to said elevated position;
a plurality of chambers, each of said chambers holding said fluid as said fluid is transferred from said elevated position to said lowered position;
a track, said track extending from said elevated position to said lowered position;
a plurality of cars, each of said chambers being coupled to an associated one of said cars, each of said cars being coupled to said track such that each said car is movable from said elevated position to said lowered position on said track.

4. The system of claim 3, further comprising said track being a circuit having a first section and a second section, said first section extending from said elevated position to said lowered position, said second section extending from said lowered position to said elevated position.

5. The system of claim 4, further comprising a storage area positioned adjacent said elevated position, each of said cars being positionable within said storage area when said secondary energy generation assembly is not in use.

6. The system of claim 3, further comprising:
said secondary energy generation assembly comprising a pulley operationally coupled to said generator such that rotation of said pulley activates said generator;
a cable engaged to said pulley wherein movement of said cable rotates said pulley; and
each of said cars being coupled to said cable wherein movement of said cars from said elevated position to said lowered position moves said cable such that said pulley is rotated.

7. An energy storage system comprising:
a primary energy generation assembly, said primary energy generation assembly having a peak primary use production limit and a peak total production limit, said peak total production limit being greater than said peak primary use production limit, said primary energy generation assembly comprising a windmill;
a secondary energy generation assembly, said second energy generation assembly utilizing gravitational transfer of a weighting material from an elevated position to a lowered position to produce electrical energy, said secondary energy generation assembly being selectively actuatable such that energy generated by said secondary energy generation assembly supplements energy produced by said primary energy generation assembly, said weighting material comprising a fluid, said fluid being water, said fluid being pumped from said lowered position to said elevated position using said energy produced by said primary energy generation assembly in excess of said peak primary use production limit, said secondary energy generation assembly comprising
a first storage tank positioned holding said fluid at said elevated position;
a second storage tank holding said fluid at said lowered position,
a pump fluidly coupling said second storage tank to said first storage tank wherein said pump transfers said fluid from said second storage tank to said first storage tank,
a generator, said generator being driven by gravitational transfer of said fluid from said elevated position to said lowered position,
a plurality of chambers, each of said chambers holding said fluid as said fluid is transferred from said elevated position to said lowered position,
a track, said track extending between said elevated position and said lowered position, said track being a circuit having a first section and a second section, said first section extending from said elevated position to said lowered position, said second section extending from said lowered position to said elevated position,
a plurality of cars, each of said chambers being coupled to an associated one of said cars, each of said cars being coupled to said track such that each said car is movable from said elevated position to said lowered position on said track,
a pulley operationally coupled to said generator such that rotation of said pulley activates said generator, and
a cable engaged to said pulley wherein movement of said cable rotates said pulley, each of said cars being coupled to said cable wherein movement of said cars from said elevated position to said lowered position moves said cable such that said pulley is rotated;
a storage area positioned adjacent said elevated position, each of said cars being positionable within said storage area when said secondary energy generation assembly is not in use; and
wherein energy produced by said primary energy generation assembly in excess of said peak primary use production limit is utilized to move said weighting material from said lowered position to said elevated position.

* * * * *